United States Patent
Iriguchi et al.

(10) Patent No.: US 11,480,947 B2
(45) Date of Patent: Oct. 25, 2022

(54) CONTROL INFORMATION GENERATION DEVICE AND CONTROL INFORMATION GENERATION METHOD FOR CONTROLLING AN ADDITIVE MANUFACTURING APPARATUS USING BEAD WIDTH CORRECTION

(71) Applicant: Mitsubishi Electric Corporation, Tokyo (JP)

(72) Inventors: Kenji Iriguchi, Tokyo (JP); Nobuhiro Shinohara, Tokyo (JP); Daiji Morita, Tokyo (JP); Nobuyuki Sumi, Tokyo (JP); Shun Kayashima, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/604,771

(22) PCT Filed: Jun. 14, 2019

(86) PCT No.: PCT/JP2019/023760
§ 371 (c)(1),
(2) Date: Oct. 19, 2021

(87) PCT Pub. No.: WO2020/250446
PCT Pub. Date: Dec. 17, 2020

(65) Prior Publication Data
US 2022/0043430 A1 Feb. 10, 2022

(51) Int. Cl.
*B33Y 50/02* (2015.01)
*B29C 64/393* (2017.01)
(Continued)

(52) U.S. Cl.
CPC ........ *G05B 19/41815* (2013.01); *B23K 9/042* (2013.01); *B29C 64/393* (2017.08);
(Continued)

(58) Field of Classification Search
CPC ........ G05B 19/41815; G05B 19/41805; G05B 19/4183; G05B 19/41865; B23K 9/042;
(Continued)

(56) References Cited

U.S. PATENT DOCUMENTS 6,823,230 B1* 11/2004 Jamalabad ......... G05B 19/4099
700/182
2009/0299517 A1* 12/2009 Holzwarth ............. B33Y 50/02
700/119
(Continued)

FOREIGN PATENT DOCUMENTS

CN  106141372 A  11/2016
JP  2016-196012 A  11/2016
(Continued)

OTHER PUBLICATIONS

Donghong Ding, "Adaptive path planning for wire-feed additive manufacturing using medial axis transformation", Journal of cleaner production, vol. 133, p. 942-952 (Year: 2016).*
(Continued)

*Primary Examiner* — Kenneth M Lo
*Assistant Examiner* — Jonathan Michael Skrzycki
(74) *Attorney, Agent, or Firm* — Xsensus LLP

(57) ABSTRACT

A control information generation device generates control information for controlling an additive manufacturing apparatus that manufactures a layer shape using a bead that is a manufactured object formed by adding a molten processing material to a target surface while moving a processing position along a manufacturing path, and manufactures a three-dimensional shape in which the layer shapes are stacked. The device includes: a bead width correction unit that obtains a corrected width on the basis of the manufacturing path and a reference width of a cross section of the bead, the corrected width being a width of the cross section
(Continued)

for allowing the beads to be adjacent to each other without overlapping; a path correction unit that obtains a corrected path on the basis of the manufacturing path and the corrected width; and a control information output unit that outputs control information indicating the corrected path and the corrected width.

9 Claims, 15 Drawing Sheets

(51) Int. Cl.
*G05B 19/418* (2006.01)
*B23K 9/04* (2006.01)
(52) U.S. Cl.
CPC .......... *B33Y 50/02* (2014.12); *G05B 19/4183* (2013.01); *G05B 19/41805* (2013.01); *G05B 19/41865* (2013.01)
(58) Field of Classification Search
CPC .......... B23K 9/04; B23K 15/00; B23K 26/34; B29C 64/393; B29C 64/118; B33Y 50/02; B33Y 10/00
See application file for complete search history.

(56) References Cited

U.S. PATENT DOCUMENTS

2017/0266884 A1  9/2017  Maeda
2017/0320267 A1*  11/2017  Lind ..................... B29C 64/209
2018/0236728 A1*  8/2018  Hovanec ............ G05B 19/4099
2019/0025798 A1*  1/2019  Yamasaki ............ B23K 9/0953
2019/0283166 A1*  9/2019  Clark ....................... B23K 9/16
2019/0337234 A1  11/2019  Hashimoto et al.

FOREIGN PATENT DOCUMENTS

| JP | 2017-144458 A | 8/2017 |
| JP | 2017-165041 A | 9/2017 |
| JP | 2018-176597 A | 11/2018 |
| WO | 2018/109832 A1 | 6/2018 |

OTHER PUBLICATIONS

Donghong Ding, "A multi-bead overlapping model for robotic wire and arc additive manufacturing (WAAM)", Robotics and Computer-integrated manufacturing, vol. 31, p. 101-110 (Year: 2015).*

International Search Report and Written Opinion dated Sep. 3, 2019, received for PCT Application PCT/JP2019/023760, Filed on Jun. 14, 2019, 9 pages including English Translation.

Decision to Grant dated Dec. 17, 2019, received for JP Application 2019-561206, 5 pages including English Translation.

Chinese Office Action dated Jul. 13, 2022, in Chinese patent application No. 201980097352.4.

* cited by examiner

CONTROL INFORMATION GENERATION DEVICE AND CONTROL INFORMATION GENERATION METHOD FOR CONTROLLING AN ADDITIVE MANUFACTURING APPARATUS USING BEAD WIDTH CORRECTION

CROSS-REFERENCE TO RELATED APPLICATION

The present application is based on PCT filing PCT/JP2019/023760, filed Jun. 14, 2019, the entire contents of which are incorporated herein by reference.

FIELD

The present invention relates to a control information generation device and a control information generation method that generate control information for controlling an additive manufacturing apparatus that manufactures a three-dimensional shape by stacking a processing material.

BACKGROUND

An additive manufacturing apparatus that manufactures a three-dimensional shape by stacking a molten processing material manufactures a layer shape by aligning beads, which are manufactured objects formed by melting and adding the processing material to a target surface, while moving a processing position along a manufacturing path indicated by control information, and manufactures a three-dimensional shape by stacking the layer shapes.

Patent Literature 1 discloses a control information generation device that generates control information to be used by an additive manufacturing apparatus. The control information generation device described in Patent Literature 1 generates a manufacturing path in which an overlap ratio between beads is set to a specific overlap ratio such that an upper surface of a layer has a predetermined flatness. The control information generation device adjusts a stacking condition such as an added amount of the processing material for a portion where the overlap ratio between the beads is not equal to the specific overlap ratio.

CITATION LIST

Patent Literature

Patent Literature 1: Japanese Patent Application Laid-open No. 2017-144458

SUMMARY

Technical Problem

However, according to the conventional technique described above, in a portion where the manufacturing path changes in direction, the stacking condition such as the added amount of the processing material is adjusted so as to have a predetermined flatness in accordance with the overlap of the beads generated on the inner side of the manufacturing path, where there has been a problem that the manufacturing quality may be reduced due to the overlap of the beads on the inner side of the manufacturing path.

The present invention has been made in view of the above, and an object of the present invention is to provide a control information generation device capable of improving the manufacturing quality.

Solution to Problem

In order to solve the above problem and achieve the object, a control information generation device according to the present invention generates control information for controlling an additive manufacturing apparatus that manufactures a layer shape using a bead that is a manufactured object formed by adding a molten processing material to a target surface while moving a processing position along a manufacturing path, and manufactures a three-dimensional shape in which the layer shapes are stacked. The control information generation device includes: a bead width correction unit that obtains a corrected width on the basis of the manufacturing path and a reference width of a cross section of the bead, the corrected width being a width of the cross section for allowing the beads to be adjacent to each other without overlapping; a path correction unit that obtains a corrected path on the basis of the manufacturing path and the corrected width; and a control information output unit that outputs control information indicating the corrected path and the corrected width.

Advantageous Effects of Invention

The control information generation device according to the present invention has an effect that the manufacturing quality can be improved.

DESCRIPTION OF EMBODIMENT

A control information generation device and a control information generation method according to an embodiment of the present invention will now be described in detail with reference to the drawings. Note that the present invention is not limited to the embodiment.

First Embodiment

Figure 1:
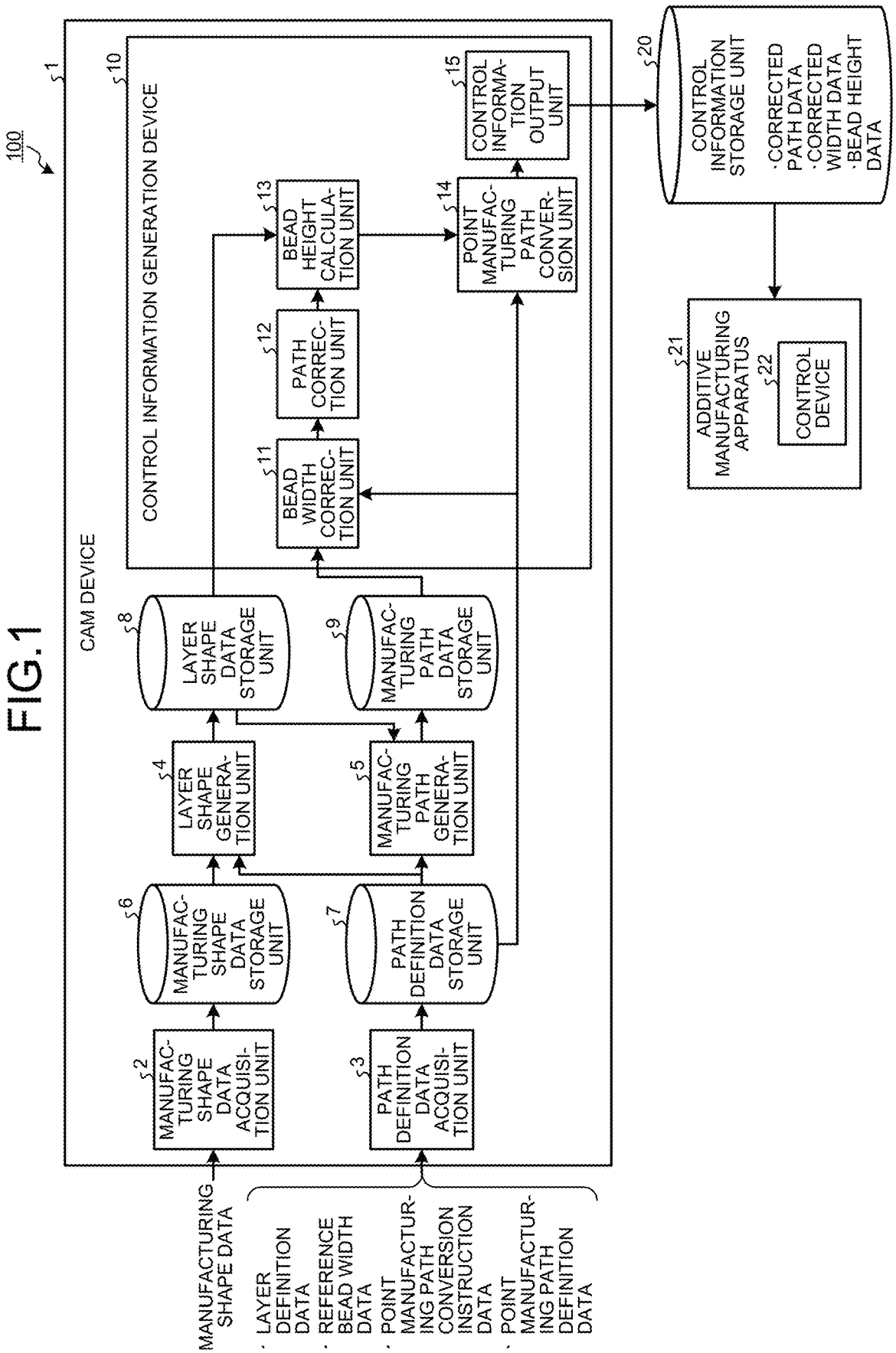
FIG. 1 is a diagram illustrating a configuration of an additive manufacturing system according to a first embodiment of the present invention.

FIG. 1 is a diagram illustrating a configuration of an additive manufacturing system 100 according to a first embodiment of the present invention. The additive manufacturing system 100 includes an additive manufacturing apparatus 21, a computer aided manufacturing (CAM) device 1 that generates control information for controlling the additive manufacturing apparatus 21, and a control information storage unit 20 that stores the control information generated by the CAM device 1.

The CAM device 1 includes a control information generation device 10 that generates the control information for controlling the additive manufacturing apparatus 21. The CAM device 1 includes a manufacturing shape data acquisition unit 2, a path definition data acquisition unit 3, a layer shape generation unit 4, a manufacturing path generation unit 5, a manufacturing shape data storage unit 6, a path definition data storage unit 7, a layer shape data storage unit 8, and a manufacturing path data storage unit 9.

The manufacturing shape data acquisition unit 2 acquires manufacturing shape data indicating a manufacturing shape that is the shape of a manufacturing target from the outside of the CAM device 1. The manufacturing shape data acquisition unit 2 causes the manufacturing shape data storage unit 6 to store the acquired manufacturing shape data.

The path definition data acquisition unit 3 acquires path definition data for defining a manufacturing path from the outside of the CAM device 1. The path definition data acquired by the path definition data acquisition unit 3 includes, for example, layer definition data for defining a layer that divides the manufacturing shape, and reference bead width data indicating a reference width of a bead cross section used in generating the manufacturing path. The path definition data can further include point manufacturing path conversion instruction data for instructing whether or not to convert the manufacturing path into point manufacturing path data indicating a point manufacturing path represented by a plurality of discrete points, and point manufacturing path definition data that is data for defining the point manufacturing path. Hereinafter, additive manufacturing using the point manufacturing path is referred to as point manufacturing. The path definition data acquisition unit 3 causes the path definition data storage unit 7 to store the acquired path definition data.

The layer shape generation unit 4 generates layer shapes obtained by dividing the manufacturing shape into a plurality of layers on the basis of the manufacturing shape data stored in the manufacturing shape data storage unit 6 and the path definition data stored in the path definition data storage unit 7. Specifically, the layer shape generation unit 4 can generate a plurality of layer shapes by dividing the manufacturing shape indicated by the manufacturing shape data into a plurality of layers indicated by the layer definition data included in the path definition data. The layer shape generation unit 4 causes the layer shape data storage unit 8 to store layer shape data indicating the plurality of layer shapes generated.

The manufacturing path generation unit 5 generates a manufacturing path on the basis of the path definition data stored in the path definition data storage unit 7 and the layer shape data stored in the layer shape data storage unit 8. Specifically, the manufacturing path generation unit 5 uses the reference bead width data included in the path definition data and the layer shape data to generate the manufacturing path for forming a manufactured object that has a shape indicated by the layer shape data with a bead having the reference width. The manufacturing path generation unit 5 stores manufacturing path data indicating the generated manufacturing path in the manufacturing path data storage unit 9.

The manufacturing shape data storage unit 6 stores the manufacturing shape data acquired by the manufacturing shape data acquisition unit 2 from the outside of the CAM device 1. The path definition data storage unit 7 stores the path definition data acquired by the path definition data acquisition unit 3 from the outside of the CAM device 1. The layer shape data storage unit 8 stores the layer shape data generated by the layer shape generation unit 4. The manufacturing path data storage unit 9 stores the manufacturing path data generated by the manufacturing path generation unit 5.

On the basis of the layer shape data stored in the layer shape data storage unit 8, the manufacturing path data stored in the manufacturing path data storage unit 9, and the reference bead width data, the point manufacturing path conversion instruction data, and the point manufacturing path definition data included in the path definition data stored in the path definition data storage unit 7, the control information generation device 10 generates control information and outputs the control information to the outside of the CAM device 1, the control information indicating a corrected width that is the width of a bead cross section for allowing the beads to be adjacent to each other without overlapping, bead height data, and a corrected path that is the manufacturing path corrected such that the beads are adjacent to each other without overlapping.

The control information generation device 10 includes a bead width correction unit 11, a path correction unit 12, a bead height calculation unit 13, a point manufacturing path conversion unit 14, and a control information output unit 15.

The bead width correction unit 11 obtains the corrected width, which is the width of the bead cross section on the manufacturing path for allowing the beads to be adjacent to each other without overlapping, on the basis of the manufacturing path indicated by the manufacturing path data stored in the manufacturing path data storage unit 9 and the reference width indicated by the reference bead width data included in the path definition data stored in the path definition data storage unit 7. The bead width correction unit 11 can obtain the corrected width on the basis of the curvature of the manufacturing path. For example, when the beads having the reference width overlap each other due to a large curvature, the bead width correction unit 11 reduces the corrected width to allow the beads to not overlap each other. The bead width correction unit 11 outputs the manufacturing path data and corrected width data indicating the obtained corrected width to the path correction unit 12.

The path correction unit 12 calculates a corrected position, which is the position of the bead cross section for allowing the beads to be adjacent to each other without overlapping, on the basis of the manufacturing path data and the corrected width data output by the bead width correction unit 11, and generates a corrected path by changing the position of the manufacturing path indicated by the manufacturing path data to the corrected position calculated. The path correction unit 12 outputs corrected path data indicating the generated corrected path and the corrected width data to the bead height calculation unit 13.

The bead height calculation unit 13 calculates a bead height, which is the height of the bead cross section on the manufacturing path required for manufacturing the layer shape, on the basis of the corrected path data and the corrected width data output from the path correction unit 12 and the layer shape data stored in the layer shape data storage unit 8. The bead height calculation unit 13 outputs bead height data indicating the calculated bead height, the corrected width data, and the corrected path data to the point manufacturing path conversion unit 14.

The point manufacturing path conversion unit 14 determines whether or not to convert the manufacturing path into a point manufacturing path on the basis of the point manufacturing path conversion instruction data included in the path definition data stored in the path definition data storage unit 7. When converting the manufacturing path into the point manufacturing path, the point manufacturing path conversion unit 14 converts the manufacturing path into the point manufacturing path on the basis of the corrected path data, the corrected width data, and the bead height data output from the bead height calculation unit 13 and the point manufacturing path definition data included in the path definition data stored in the path definition data storage unit 7, thereby generating point manufacturing path data indicating the point manufacturing path. When not converting the manufacturing path into the point manufacturing path, the point manufacturing path conversion unit 14 outputs the corrected path data output by the bead height calculation unit 13 to the control information output unit 15 as it is.

The control information output unit 15 generates control information indicating the corrected path data or the point manufacturing path data, the corrected width, and the bead height output from the point manufacturing path conversion unit 14, and outputs the generated control information to the outside of the CAM device 1. The control information is, for example, a control program.

The additive manufacturing apparatus 21 includes a control device 22. The control device 22 controls the operation of the additive manufacturing apparatus 21. The control device 22 reads the control information output from the CAM device 1, determines manufacturing conditions such as the speed of supplying the processing material and the feed speed on the manufacturing path on the basis of the corrected path, the corrected width, and the bead height indicated by the control information, and controls the operation of the additive manufacturing apparatus 21.

Figure 2:
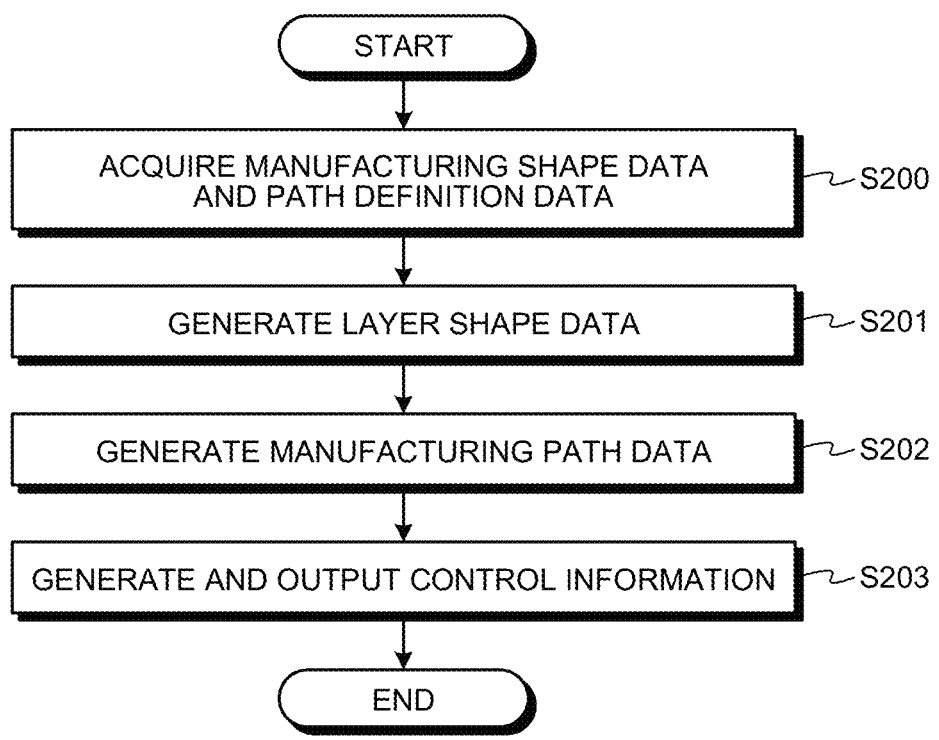
FIG. 2 is a flowchart for explaining an operation of a CAM device illustrated in FIG. 1.

Next, the operation of the CAM device 1 will be described. FIG. 2 is a flowchart for explaining the operation of the CAM device 1 illustrated in FIG. 1. The manufacturing shape data acquisition unit 2 of the CAM device 1 acquires manufacturing shape data from the outside of the CAM device 1, and the path definition data acquisition unit 3 acquires path definition data from the outside of the CAM device 1 (step S200). The manufacturing shape data is stored in the manufacturing shape data storage unit 6, and the path definition data is stored in the path definition data storage unit 7.

The layer shape generation unit 4 generates layer shape data indicating layer shapes, which are a portion obtained by dividing the manufacturing shape into a plurality of layers, on the basis of the manufacturing shape data and the path definition data, and causes the layer shape data storage unit 8 to store the generated layer shape data (step S201).

Figure 3:
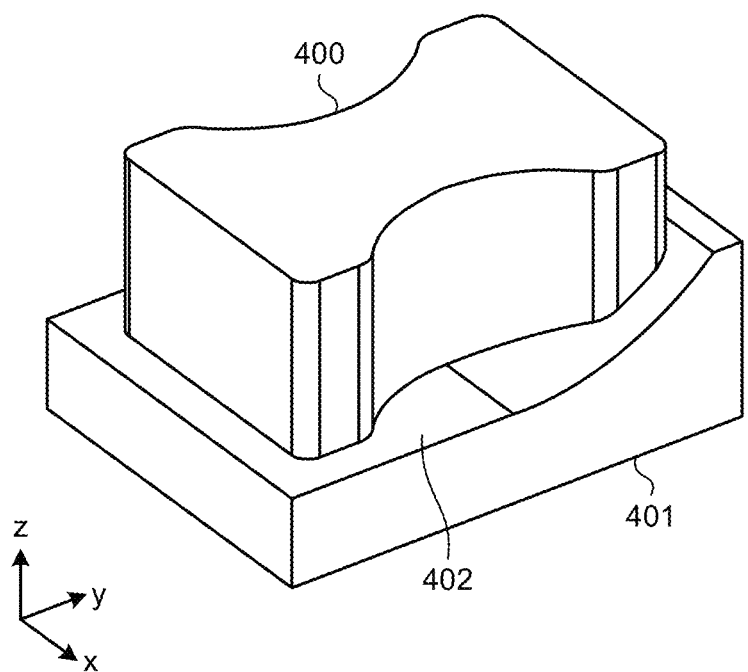
FIG. 3 is a diagram illustrating an example of manufacturing shape data acquired by a manufacturing shape data acquisition unit illustrated in FIG. 1.

FIG. 3 is a diagram illustrating an example of the manufacturing shape data acquired by the manufacturing shape data acquisition unit 2 illustrated in FIG. 1. The manufacturing shape includes a shape 400 of an object to be manufactured using the processing material, and a base shape 401 representing a base for stacking layers at the time of manufacturing. Layer definition data includes, for example, reference surface designation data for designating a surface 402 that serves as a reference for the layer, and height data indicating a height HB of the layer.

Figure 4:
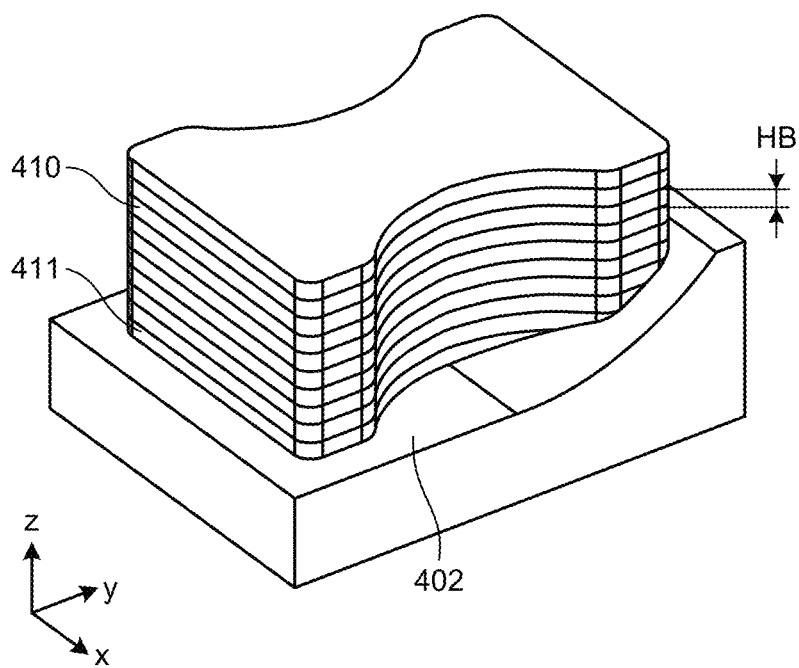
FIG. 4 is a diagram illustrating a layer shape that is a portion obtained by dividing a manufacturing shape illustrated in FIG. 3.

FIG. 4 is a diagram illustrating the layer shapes that are the portion obtained by dividing the manufacturing shape illustrated in FIG. 3. FIG. 4 illustrates a state in which the shape 400 illustrated in FIG. 3 is divided by the height HB in parallel with the surface 402. The layer shapes generated include a layer shape 410 having a uniform height and a layer shape 411 having a non-uniform height.

Figure 5:
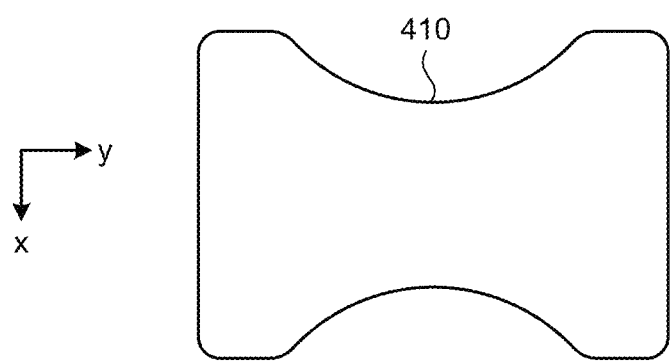
FIG. 5 is a plan view of the layer shape illustrated in FIG. 4.
Figure 6:
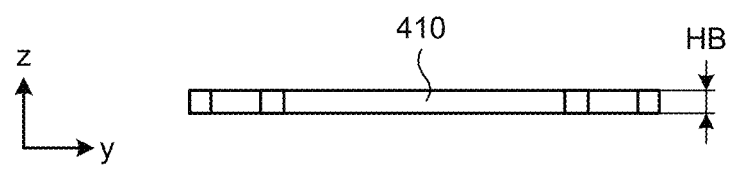
FIG. 6 is a side view of the layer shape illustrated in FIG. 4.

FIG. 5 is a plan view of the layer shape 410 illustrated in FIG. 4. FIG. 5 illustrates the layer shape 410 in an xy plane. FIG. 6 is a side view of the layer shape 410 illustrated in FIG. 4. FIG. 6 illustrates the layer shape 410 in a yz plane. The layer shape 410 has the height HB that is uniform.

Figure 7:
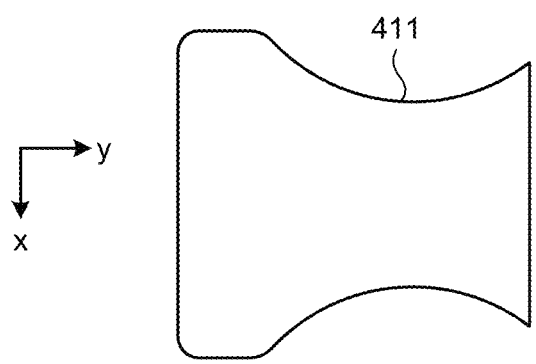
FIG. 7 is a plan view of the layer shape illustrated in FIG. 4.
Figure 8:
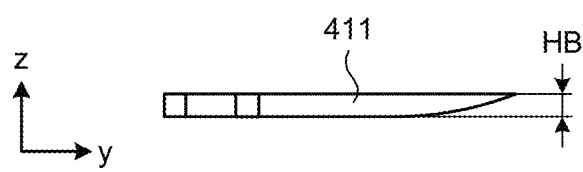
FIG. 8 is a side view of the layer shape illustrated in FIG. 4.

FIG. 7 is a plan view of the layer shape 411 illustrated in FIG. 4. FIG. 7 illustrates the layer shape 411 in the xy plane. FIG. 8 is a side view of the layer shape 411 illustrated in FIG. 4. FIG. 8 illustrates the layer shape 411 in the yz plane. The layer shape 411 has a portion having a height lower than the height HB.

The description refers back to FIG. 2. The manufacturing path generation unit 5 generates a manufacturing path for each layer shape data on the basis of the layer shape data stored in the layer shape data storage unit 8 and the path definition data stored in the path definition data storage unit 7, and causes the manufacturing path data storage unit 9 to store manufacturing path data indicating the generated manufacturing path (step S202).

Figure 9:
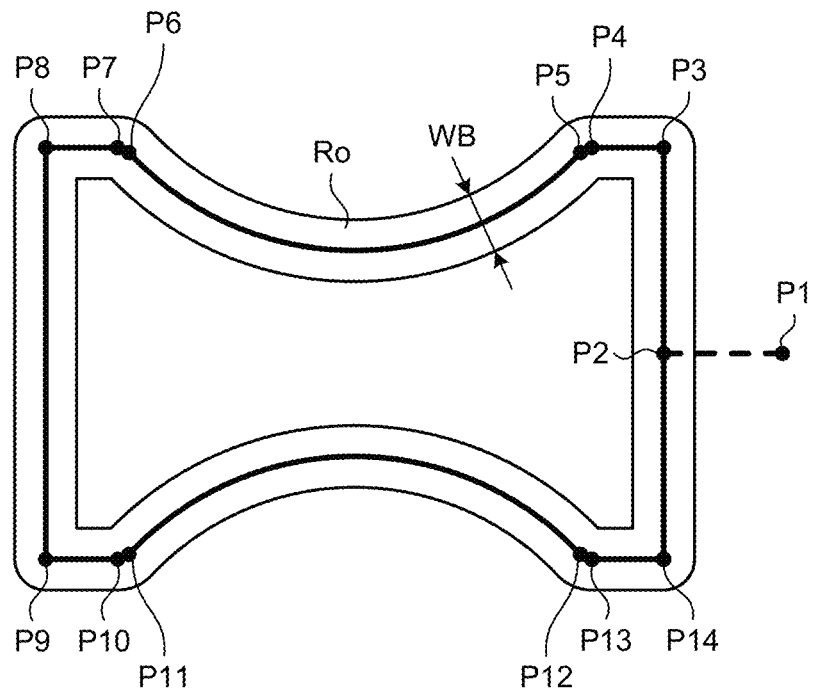
FIG. 9 is a diagram illustrating an example of a manufacturing path for a contour portion of the layer shape illustrated in FIGS. 5 and 6.

FIG. 9 is a diagram illustrating an example of the manufacturing path for a contour portion Ro of the layer shape illustrated in FIGS. 5 and 6. FIG. 9 illustrates the manufacturing path in which the position for adding the processing material is moved in the order of P1, P2, . . . , P14, P2, and P1. Here, a path indicated by a broken line such as between the point P1 and the point P2 indicates a move in which no processing material is added.

Figure 10:
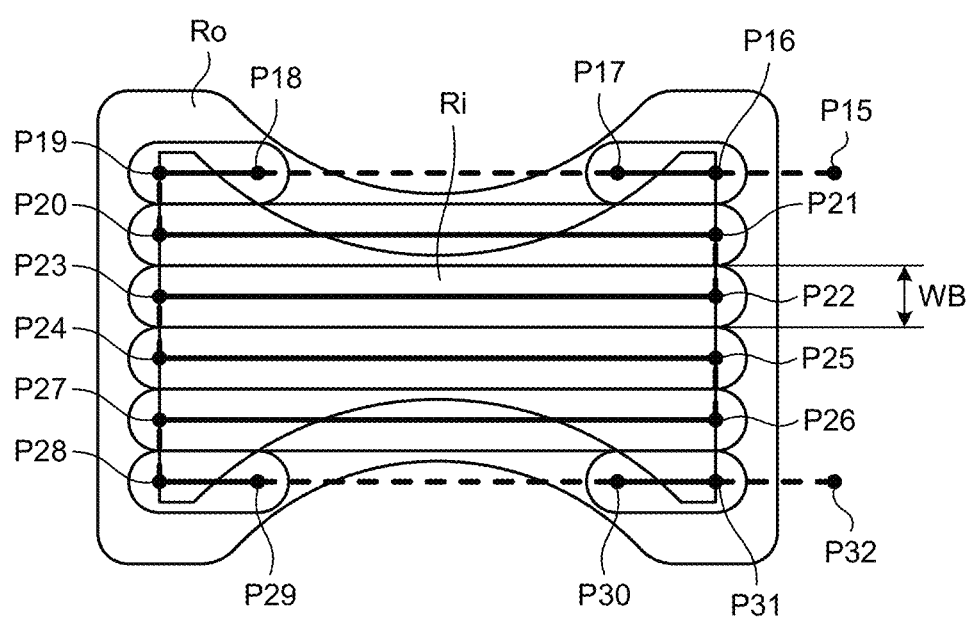
FIG. 10 is a diagram illustrating an example of a manufacturing path for an internal region of the layer shape illustrated in FIGS. 5 and 6.

FIG. 10 is a diagram illustrating an example of the manufacturing path for an internal region Ri of the layer shape illustrated in FIGS. 5 and 6. FIG. 10 illustrates the manufacturing path in which the position for adding the processing material is moved in the order of points P15, P16, . . . , and P32. As with FIG. 9, a broken line illustrated in FIG. 10 indicates a move in which no processing material is added. The manufacturing path illustrated in FIG. 10 is a path generated such that no gap is formed between beads while allowing overlap between the beads in the manufacturing using beads having a reference width WB.

Figure 11:
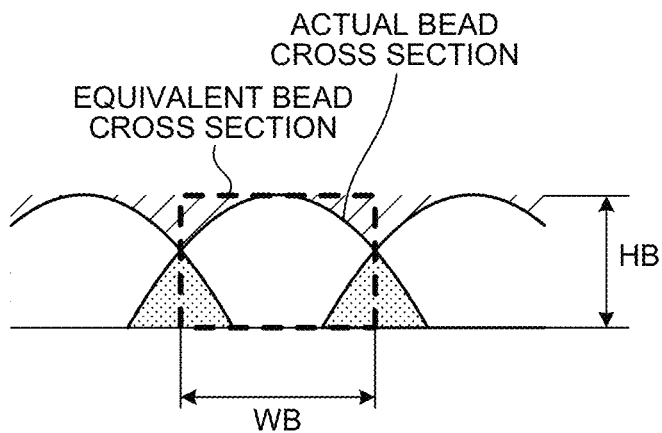
FIG. 11 is a diagram for explaining a reference width illustrated in FIG. 10.

FIG. 11 is a diagram for explaining the reference width WB illustrated in FIG. 10. The reference width WB is a width of a cross-sectional shape of an equivalent rectangular parallelepiped obtained by separating, for each bead, a manufacturing region shape formed by overlapping beads having a cross-sectional shape that is not actually a rectangular parallelepiped.

The manufacturing path illustrated in FIG. 9 allows the contour portion Ro of the layer shape to be manufactured with relatively high accuracy, but in the manufacturing using beads having a uniform width, the beads overlap on the inner side of the path in corners of the manufacturing path such as the points P3, P8, P9, and P14 and arc path portions between the points P4 and P5, the points P6 and P7, the points P10 and P11, and the points P12 and P13 in which the radius is smaller than half the width WB in the manufacturing path, whereby the manufacturing accuracy is reduced. In order to improve the manufacturing accuracy, a method that adjusts the manufacturing amount or the like is known, which however results in more manufacturing on the inner side due to the beads still overlapping on the inner side of the path.

Furthermore, the manufacturing path illustrated in FIG. 10 allows for manufacturing with high accuracy in a middle portion of the internal region Ri, but in a portion where the beads overlap with those in the manufacturing path illustrated in FIG. 9, a problem similar to the above may occur due to uneven manufacturing. An object of the present embodiment is to prevent or reduce a decrease in the manufacturing accuracy due to such uneven manufacturing.

The description refers back to FIG. 2. On the basis of the path definition data stored in the path definition data storage unit 7, the layer shape data stored in the layer shape data storage unit 8, and the manufacturing path data stored in the manufacturing path data storage unit 9, the control information generation device 10 generates control information and outputs the control information generated, the control information indicating a corrected path that is the manufacturing path corrected such that the beads are adjacent to each other without overlapping, a corrected width that is the bead width of the corrected path, and a bead height (step S203).

Figure 12:
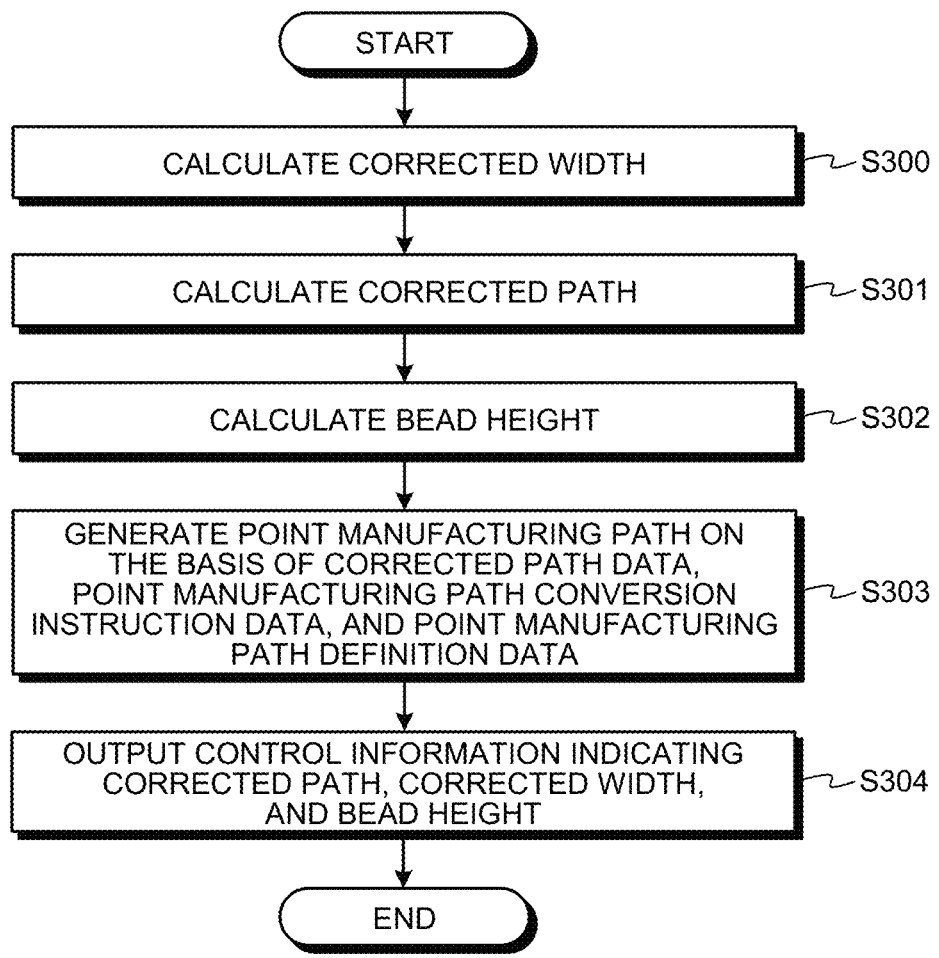
FIG. 12 is a flowchart for explaining details of step S203 of FIG. 2.

FIG. 12 is a flowchart for explaining details of step S203 of FIG. 2. The bead width correction unit 11 calculates the corrected width, which is the width of the bead cross section for allowing the bead cross sections to be adjacent to each other without overlapping, on the basis of the manufacturing path indicated by the manufacturing path data and the reference width WB of the bead cross section indicated by the reference bead width data included in the path definition data. The bead width correction unit 11 outputs bead width data indicating the calculated corrected width and the manufacturing path data to the path correction unit 12 (step S300).

At a first point on the manufacturing path, the bead width correction unit 11 searches for two circles that are in contact with the manufacturing path on the left and right of the manufacturing path and are in contact with the manufacturing path at a second point other than the first point. At this time, it is required that the circle to be searched satisfies a condition of not intersecting with the manufacturing path and having the radius less than or equal to half the reference width WB. When no circle satisfying the condition is found, the circle is assumed to be one that is in contact with the manufacturing path at the first point and has the radius of half the reference width WB. For example, the bead width correction unit 11 generates a circle that is in contact with the manufacturing path at the first point on the manufacturing path, and performs a determination on intersection between the generated circle and the manufacturing path, thereby being able to search for and calculate the circle that is in contact with the manufacturing path at a point other than the first point. The bead width correction unit 11 can search for the circle that satisfies the condition at a plurality of points on the manufacturing path by changing the first point.

Figure 13:
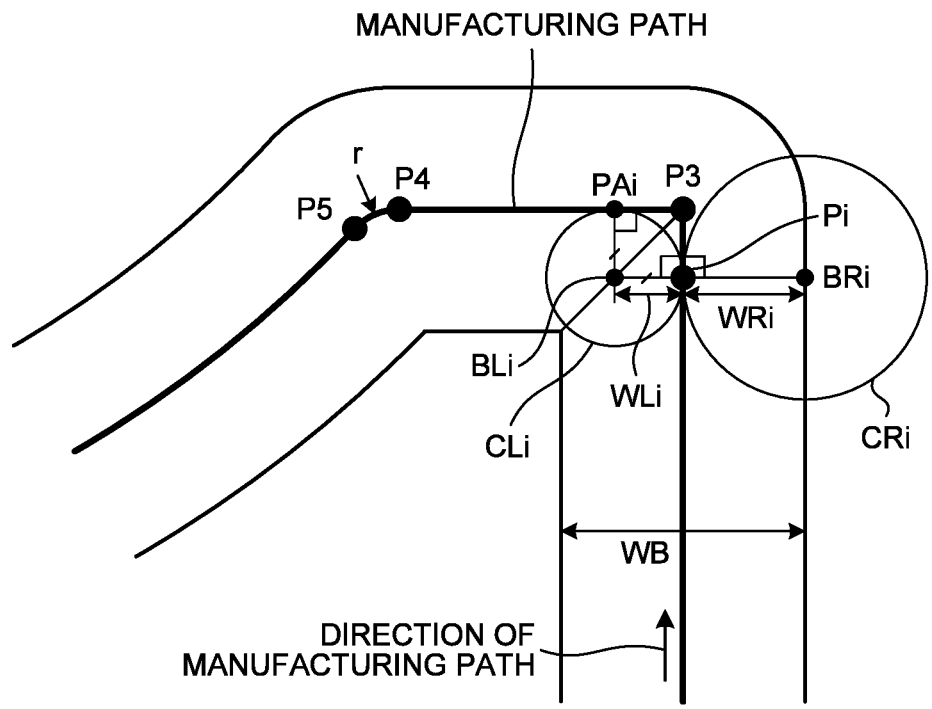
FIG. 13 is a diagram illustrating a corrected width calculated for the manufacturing path illustrated in FIG. 9.

FIG. 13 is a diagram illustrating the corrected width calculated for the manufacturing path illustrated in FIG. 9. FIG. 13 illustrates circles CLi and CRi that are in contact with the manufacturing path on the left and right sides of the manufacturing path at a point Pi on the manufacturing path, respectively. Here, the circle CLi is also in contact with the manufacturing path at a point PAi and has the center point at a point BLi and the radius of WLi. The radius WLi is smaller than half the reference width WB. A bead cross section with the width WLi on the left side of the manufacturing path at the point Pi is adjacent to a bead cross section with the width WLi on the left side of the manufacturing path at the point PAi without overlapping. Since the circle CRi has no point in contact with the manufacturing path other than the point Pi, the width WRi being the radius is set to half the reference width WB. A bead cross section with the width WRi on the right side of the manufacturing path at the point Pi does not overlap with a bead cross section at another point on the manufacturing path.

The width WLi and the width WRi obtained with respect to the point Pi as described above are bead widths on the left side and the right side of the manufacturing path of the bead cross sections with the beads adjacent to each other without overlapping at the point Pi, and define the corrected position and the corrected width of the bead cross section at the point Pi. Specifically, the corrected width is a value obtained by adding the width WLi and the width WRi obtained with respect to the point Pi. When the corrected position is set to the center of the width of the corrected path, the corrected position is a midpoint between the point BLi, which is at a distance of the width WLi to the left from the point Pi, and a point BRi at a distance of the width WRi to the right from the point Pi. In the example illustrated in FIG. 13, the width WLi is smaller than the width WRi so that the midpoint between the point BLi and the point BRi is located between the point Pi and the point BRi.

Figure 14:
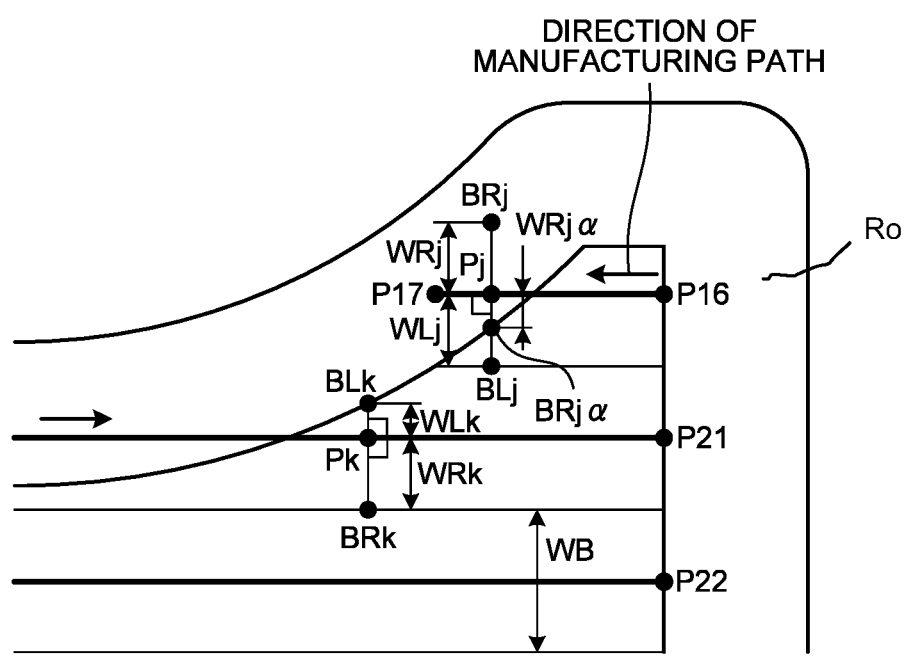
FIG. 14 is a diagram illustrating a corrected width calculated for the manufacturing path illustrated in FIG. 10.

FIG. 14 is a diagram illustrating the corrected width calculated for the manufacturing path illustrated in FIG. 10. In this example, it is assumed that the inside of the layer shape is manufactured after the contour portion Ro of the layer shape is manufactured. It is necessary to prevent the bead for manufacturing the inside of the layer shape from overlapping the bead for manufacturing the contour portion Ro of the layer shape. Therefore, first, the bead width correction unit 11 calculates the corrected width of the bead cross section by calculation similar to that for the manufacturing path of the contour portion Ro of the layer shape between the manufacturing paths inside the layer shape, and further performs calculation to extract a portion excluding a portion corresponding to the bead region of the contour portion Ro of the layer shape from the range of the calculated cross section.

At a point Pj on the manufacturing path illustrated in FIG. 14, a width WLj on the left side and a width WRj on the right side of the manufacturing path of the corrected bead cross section are both half the reference width WB between the manufacturing paths inside the layer shape. Here, a point BLj is a point moved from the point Pj to the left side of the manufacturing path by the width WLj, and a point BRj is a point moved from the point Pj to the right side of the manufacturing path by the width WRj. The range of the corrected bead cross section is represented by a line segment between the point BLj and the point BRj. Then, the bead width correction unit 11 extracts a line segment between the point BLj and a point BRjα that is a portion excluding the bead region of the contour portion Ro of the layer shape from the range of the corrected bead cross section. Here, the point BRjα is an intersection of the line segment between the point BLj and the point BRj and a boundary of the bead region of the contour portion Ro of the layer shape. By replacing the point BRj with the point BRjα, it is possible to prevent the bead for manufacturing the inside of the layer shape from overlapping the bead for manufacturing the contour portion Ro of the layer shape.

From the extracted line segment, the bead width correction unit 11 determines widths on the left side and the right side of the manufacturing path for the corrected bead cross section as follows. Since the point BLj on the left side of the extracted line segment is on the left side of the manufacturing path, the bead width correction unit 11 sets the distance from the point Pj to the point BLj to be a width WLj on the left side. The point BRjα on the right side of the extracted line segment is not on the right side but on the left side of the manufacturing path, so that the bead width correction unit 11 sets a value obtained by adding a negative sign to the distance from the point Pj to the point BRjα to be a width −WRjα on the right side. By expressing the widths on the left side and the right side of the manufacturing path for the corrected bead cross section with the signed values, it is possible to express the range of the bead cross section located only on the left side or the right side of the manufacturing path.

Figure 15:
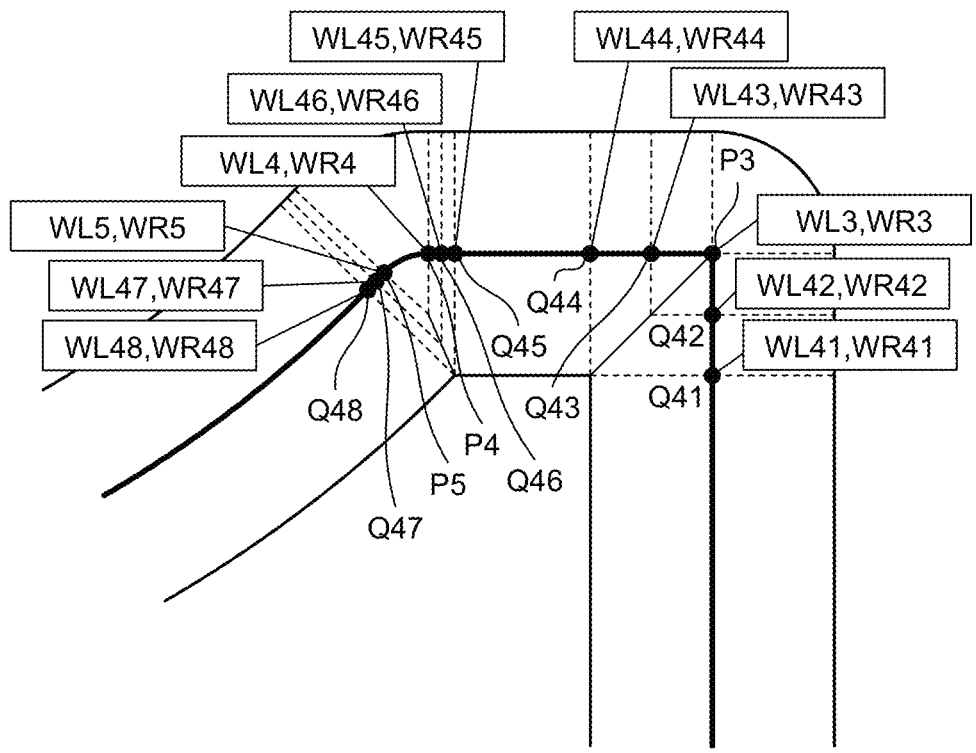
FIG. 15 is a diagram illustrating data obtained by adding the corrected width illustrated in FIG. 13 to manufacturing path data.

FIG. 15 is a diagram illustrating data obtained by adding the corrected width illustrated in FIG. 13 to manufacturing path data. In the data illustrated in FIG. 15, corrected width data WL41 to WL48 and WR41 to WR48 on the left and right sides of the bead cross sections for allowing the beads to be adjacent to each other without overlapping are added to corresponding points Q41 to Q48 on the manufacturing path for the contour portion Ro of the layer shape. For example, the data WL42 and WR42 are added to the point Q42 on the manufacturing path of FIG. 15 as the corrected width data on the left and right sides of the manufacturing path of the bead cross section for allowing the beads to be adjacent to each other without overlapping.

Figure 16:
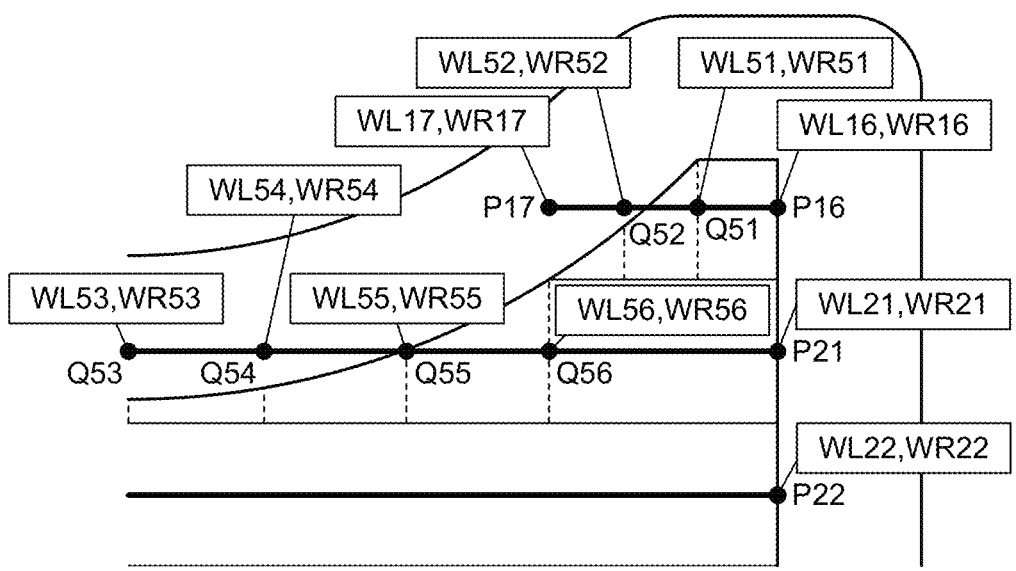
FIG. 16 is a diagram illustrating data obtained by adding the corrected width illustrated in FIG. 14 to manufacturing path data.

FIG. 16 is a diagram illustrating data obtained by adding the corrected width illustrated in FIG. 14 to manufacturing path data. FIGS. 15 and 16 each illustrate an example of the data output by the bead width correction unit 11. In the data illustrated in FIG. 16, corrected width data WL16, WL17, WL21, WL22, WL51 to WL56, WR16, WR17, WR21, WR22, and WR51 to WR56 on the left and right sides of the bead cross sections for allowing the beads to be adjacent to each other without overlapping are added to corresponding points P16, P17, P21, P22, and Q51 to Q56 on the manufacturing path for the internal region Ri of the layer shape.

The point on the manufacturing path to be added to such data is preferably a point at a boundary of a section in which the width of the bead cross section after correction with respect to the manufacturing path changes and a point within the section. The point included in the data is preferably selected such that the corrected path is properly generated on the basis of definition data of the position or width of the bead cross section after correction in the path correction unit 12 to which the manufacturing path data is passed later.

The description refers back to FIG. 12. The path correction unit 12 calculates a corrected position by correcting the position of the bead cross section from the manufacturing path and the bead cross section having the corrected width calculated in step S300, and calculates a corrected path by changing the position of the manufacturing path to the corrected position calculated (step S301). The path correction unit 12 outputs, to the bead height calculation unit 13, data obtained by adding the corrected width data to corrected path data indicating the corrected path.

The path correction unit 12 calculates the corrected position at each point on the manufacturing path on the basis of the manufacturing path data and the corrected width data output by the bead width correction unit 11. For a certain point Q on the manufacturing path, the path correction unit 12 calculates a position K of the center of the bead cross section using the following expression (1), where "WL" and "WR" are the widths on the left side and the right side indicated by the corrected width data added to the point Q, respectively.

$$K=(WL-WR)/2 \tag{1}$$

When "K" is zero, the center position of the bead cross section coincides with the position of the original manufacturing path, and when "K" is other than zero, the center position of the bead cross section deviates from the original manufacturing path. The path correction unit 12 sets a position shifted from the point Q to the left side of the manufacturing path by "K" as the corrected position when "K" is a positive value, or sets a position shifted from the point Q to the right side of the manufacturing path by "K" as the corrected position when "K" is a negative value.

The path correction unit 12 corrects the manufacturing path so as to pass through the calculated corrected position, and adds the corrected width data to a point on the corrected path that is the manufacturing path after correction.

Note that the path correction unit 12 can also set a position other than the center of the bead cross section as the corrected position. For example, in the manufacturing of adjacent beads, the bead that has already been manufactured may have an influence on the bead that is manufactured later and cause it to be formed unevenly. As the influence of the bead that has already been manufactured, for example, the bead to be newly manufactured may be drawn toward the bead that has already been manufactured by surface tension. Such an influence may be able to be alleviated by shifting the corrected position from the center of the bead cross section. Therefore, the path correction unit 12 can obtain the corrected position on the basis of allowing a target path, which is one path included in the manufacturing path, and an adjacent path, which is a path adjacent to the target path, to share the manufacturing. At this time, the path correction unit 12 can adjust the corrected position on the basis of the manufacturing order of the target path and the adjacent path. The path correction unit 12 can switch an expression used in calculating the position K on the basis of the manufacturing order of the target path and the adjacent path.

For example, a width WM of the bead cross section with respect to the point Q can be calculated using the following expression (2). The corrected width data added to the manufacturing path output by the bead width correction unit 11 is indicated by the width data on the left side of the manufacturing path and the width data on the right side of the manufacturing path. The corrected width data added to the corrected path output by the path correction unit 12 is indicated by the entire width data of the bead.

$$WM = WL + WR \quad (2)$$

Here, a point corresponding to a corner in the original manufacturing path is subjected to the following processing. The corner portion in the original manufacturing path changes in a cross-sectional direction discontinuously between a path reaching the corner and a path starting from the corner. Therefore, the path correction unit 12 calculates the corrected position using the calculation method similar to that described above for each cross-sectional direction. The path correction unit 12 then adds a path that goes around a corner passing between the corrected positions calculated separately for each cross-sectional direction. Corrected width data added to a start point and an end point of the added path is a value calculated from the data added to the corresponding corner in the original manufacturing path using the above expression (2).

Figure 17:
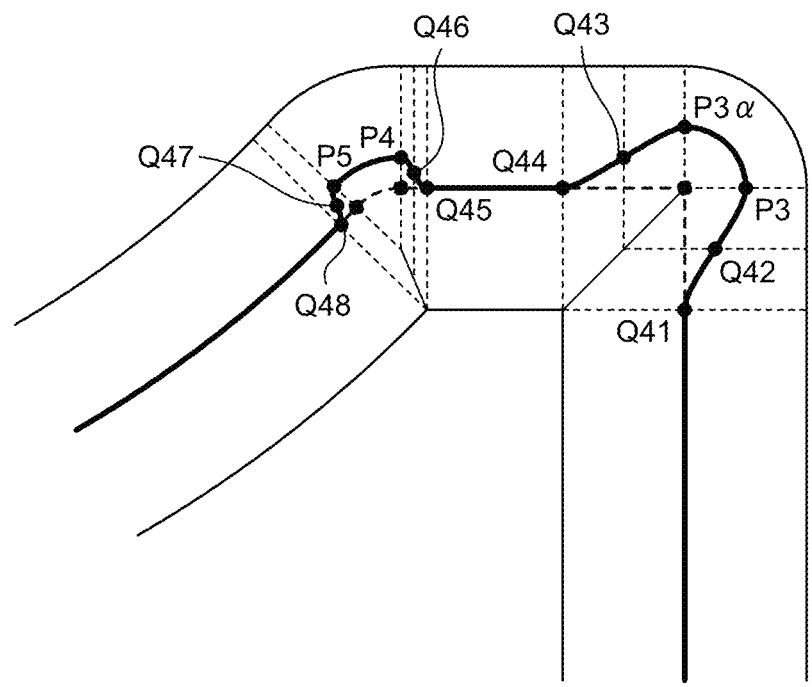
FIG. 17 is a diagram illustrating a corrected path generated on the basis of the data illustrated in FIG. 15.

FIG. 17 is a diagram illustrating a corrected path generated on the basis of the data illustrated in FIG. 15. In FIG. 17, the corrected positions of the points Q42, Q43, Q46, P4, P5, and Q47 deviate from the original manufacturing path. The path between the points has also been corrected in accordance with the corrected positions. Moreover, for the point P3 corresponding to the corner portion in the original manufacturing path, two corrected positions being the point P3 and a point P3α are calculated, and a path is added between these points. At the corner portion, the corrected width is smaller than the reference width WB such as half the reference width WB, and the manufacturing path is corrected so as to go around the outside of the corner portion.

Figure 18:
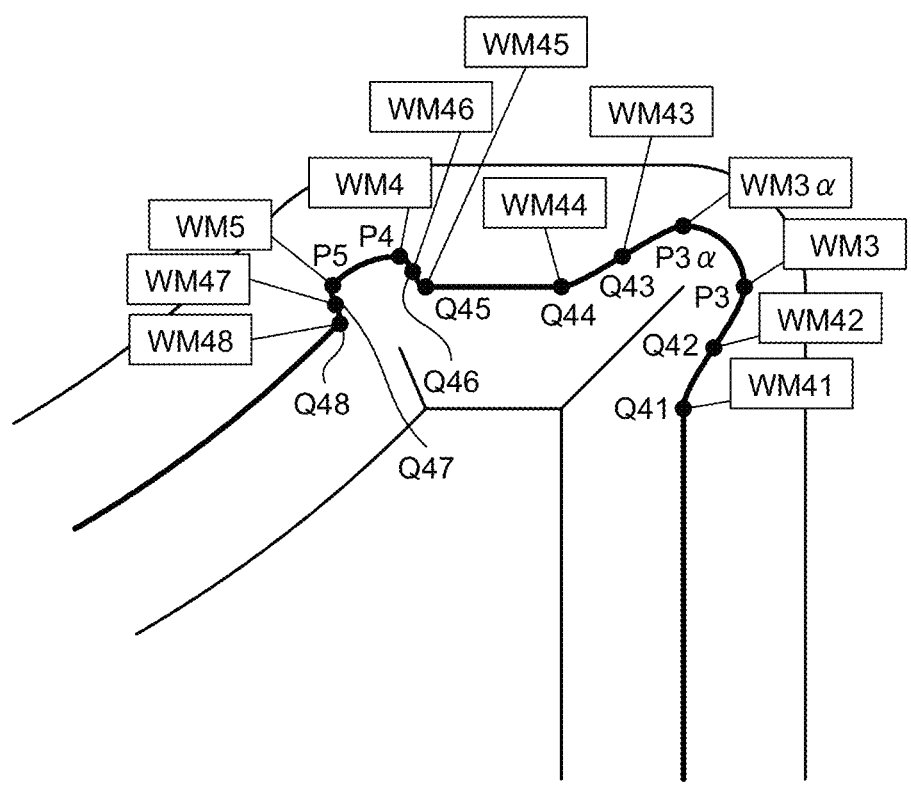
FIG. 18 is a diagram illustrating data obtained by adding corrected width data to the corrected path illustrated in FIG. 17.

FIG. 18 is a diagram illustrating data obtained by adding the corrected width data to the corrected path illustrated in FIG. 17. As illustrated in FIG. 18, the path correction unit 12 outputs data indicating the corrected path and the corrected width at each point on the corrected path to the bead height calculation unit 13. In FIG. 18, corrected widths WM41, WM42, WM3, WM3α, WM43 to WM45, WM4, WM5, and WM46 to WM48 are added to the points Q41, Q42, P3, P3α, Q43 to Q45, P4, P5, and Q46 to Q48 on the corrected path, respectively.

Figure 19:
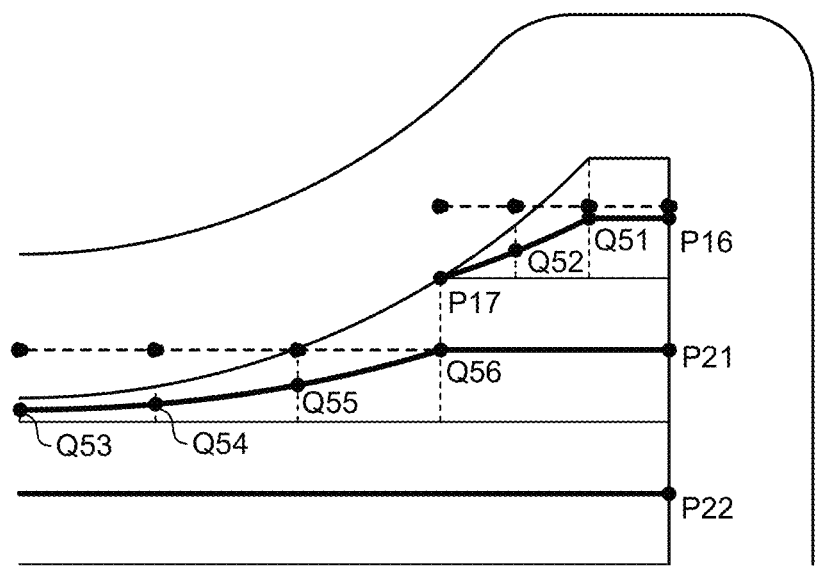
FIG. 19 is a diagram illustrating a corrected path generated on the basis of the data illustrated in FIG. 16.
Figure 20:
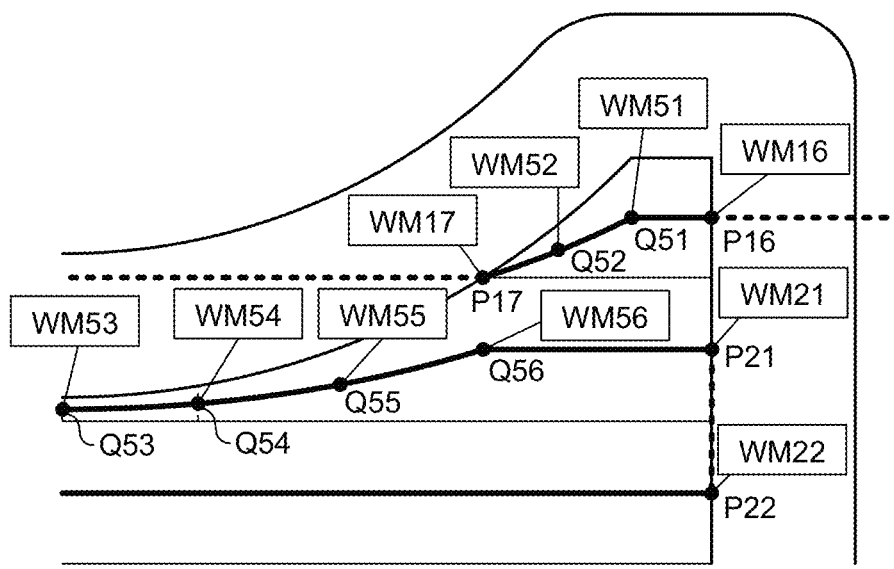
FIG. 20 is a diagram illustrating data obtained by adding corrected width data to the corrected path illustrated in FIG. 19.

FIG. 19 is a diagram illustrating a corrected path generated on the basis of the data illustrated in FIG. 16. As illustrated in FIG. 19, the points Q52, P17, and Q53 to Q55 deviate from the original manufacturing path. FIG. 20 is a diagram illustrating data obtained by adding the corrected width data to the corrected path illustrated in FIG. 19. In FIG. 20, corrected widths WM16, WM51, WM52, WM17, WM53 to WM56, WM21, and WM22 are added to the points P16, Q51, Q52, P17, Q53 to Q56, P21, and P22 on the corrected path, respectively.

Figure 21:
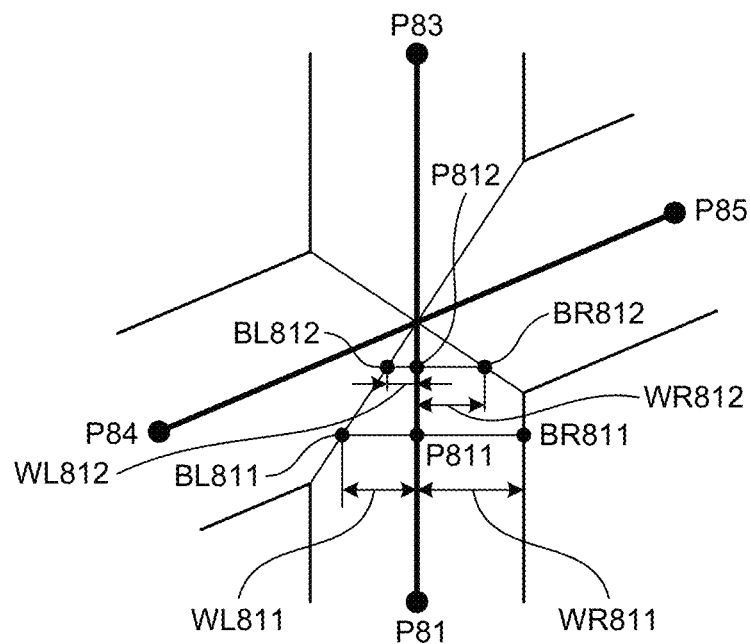
FIG. 21 is a diagram illustrating a corrected width calculated for an intersecting manufacturing path by the control information generation device illustrated in FIG. 1.

FIG. 21 is a diagram illustrating a corrected width calculated for an intersecting manufacturing path by the control information generation device 10 illustrated in FIG. 1. A width WL811 on the left side and a width WR811 on the right side at a point P811 on the manufacturing path before correction are illustrated. Similarly, a width WL812 on the left side and a width WR812 on the right side at a point P812 on the manufacturing path before correction are illustrated.

Figure 22:
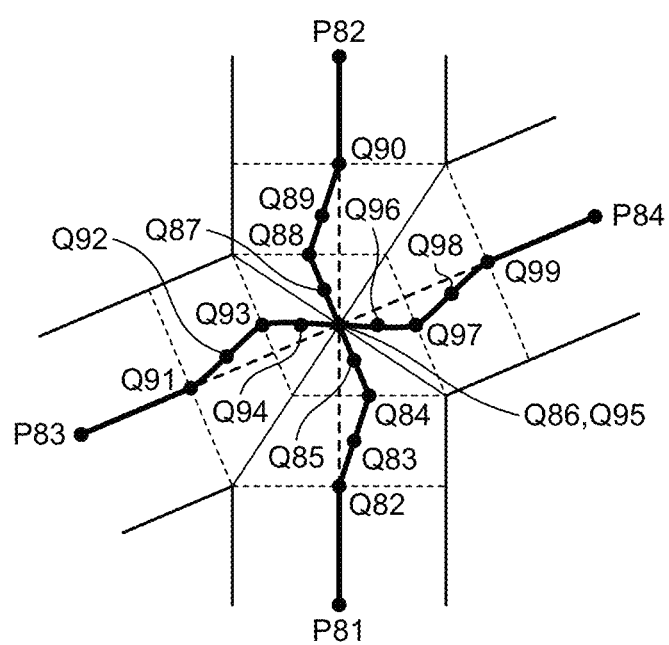
FIG. 22 is a diagram illustrating a corrected path generated on the basis of the data illustrated in FIG. 21.

FIG. 22 is a diagram illustrating a corrected path generated on the basis of the data illustrated in FIG. 21. FIG. 22 illustrates the corrected path using points P81 to P84 and Q82 to Q99 on the corrected path. As described above, for the manufacturing path having various shapes, the bead width correction unit 11 and the path correction unit 12 of the present invention can generate the corrected path data to which the corrected width of the bead cross section corrected so as to allow the beads to be adjacent to each other without overlapping and to avoid uneven manufacturing is added.

The description refers back to FIG. 12. On the basis of the corrected path data output by the path correction unit 12 and the layer shape data stored in the layer shape data storage unit 8, the bead height calculation unit 13 calculates a bead height, which is required for manufacturing a layer shape using a bead having the corrected width added to the corrected path data, at a plurality of points on the corrected path (step S302). The bead height calculation unit 13 generates corrected path data to which bead height data indicating the calculated bead height and the corrected width data are added, and outputs the generated corrected path data to the point manufacturing path conversion unit 14.

Figure 23:
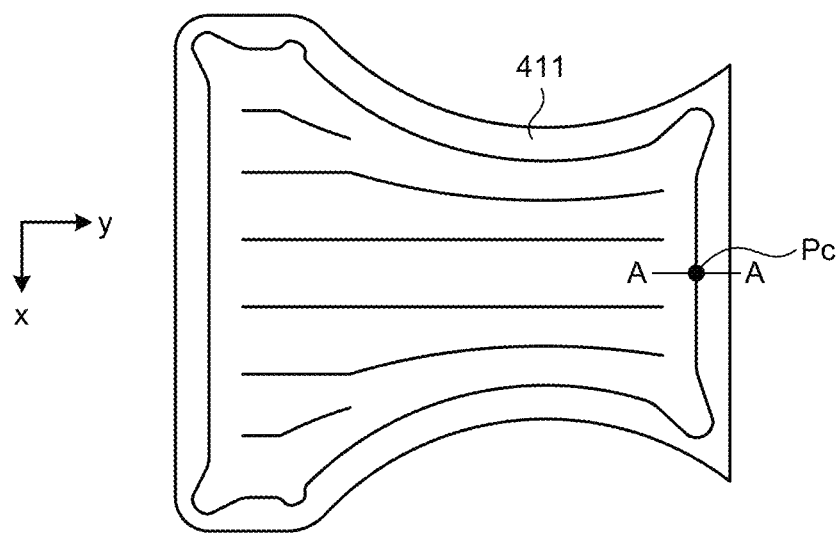
FIG. 23 is a diagram illustrating a corrected path generated for the layer shape illustrated in FIG. 7.
Figure 24:
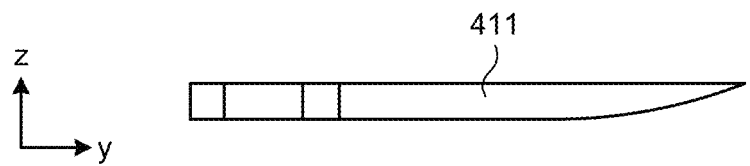
FIG. 24 is a side view of the layer shape illustrated in FIG. 23.

FIG. 23 is a diagram illustrating a corrected path generated for the layer shape 411 illustrated in FIG. 7. FIG. 23 illustrates the layer shape 411 and the corrected path in the xy plane. FIG. 24 is a side view of the layer shape 411 illustrated in FIG. 23. The layer shape 411 illustrated in FIGS. 23 and 24 has a non-uniform height. The bead height calculation unit 13 calculates data of a cross-sectional shape of the layer shape in the corrected bead cross section on the basis of the corrected width data and the layer shape data added to a point on the corrected path.

Figure 25:
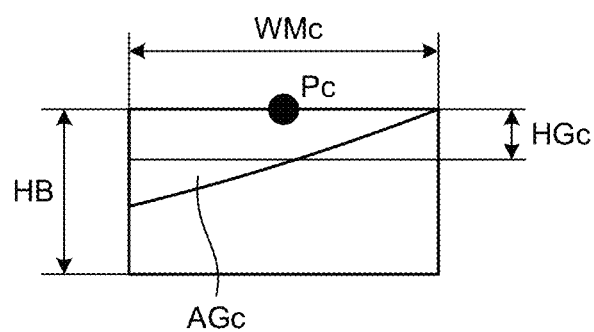
FIG. 25 is a diagram illustrating a cross-sectional shape of the layer shape calculated for a point Pc illustrated in FIG. 23.

FIG. 25 is a diagram illustrating the cross-sectional shape of the layer shape 411 calculated for a point Pc illustrated in FIG. 23. At the point Pc on the corrected path, the cross-sectional shape of the layer shape 411 does not satisfy the reference height HB in the bead cross section having a width WMc. Therefore, when the manufacturing is performed with a certain amount of processing material, the manufacturing shape may protrude and swell from the layer shape 411. It is thus preferable to adjust the manufacturing amount. Therefore, the bead height calculation unit 13 calculates an average height, which is an average bead height in the cross-sectional shape of the layer shape 411, and passes the calculated average height to the control device 22 of the additive manufacturing apparatus 21 together with the corrected path data, so that the control device 22 can properly adjust the manufacturing amount. An average height HGc in the cross-sectional shape of the layer shape 411 with respect to the point Pc is expressed by the following expression (3), where "AGc" is the area of the cross-sectional shape of the layer shape 411.

$$HGc=AGc/WMc \qquad (3)$$

The bead height calculation unit 13 calculates the average height HGc in the cross-sectional shape of the layer shape for each point on the corrected path and outputs, to the point manufacturing path conversion unit 14, data obtained by adding the calculated average height HGc and the corrected width data to the corrected path data.

The description refers back to FIG. 12. The point manufacturing path conversion unit 14 generates a point manufacturing path to be output to the control information output unit 15 on the basis of the corrected path data output from the bead height calculation unit 13 and the point manufacturing path conversion instruction data and the point manufacturing path definition data included in the path definition data stored in the path definition data storage unit 7 (step S303). Specifically, when the point manufacturing path conversion instruction data instructs to generate a path for point manufacturing, the point manufacturing path conversion unit 14 converts the corrected path into manufacturing path data of point manufacturing, and outputs the corrected path data after conversion to the control information output unit 15. When the point manufacturing path conversion instruction data does not instruct to generate a path for point manufacturing, the point manufacturing path conversion unit 14 outputs the corrected path data output by the bead height calculation unit 13 to the control information output unit 15 as it is.

Figure 26:
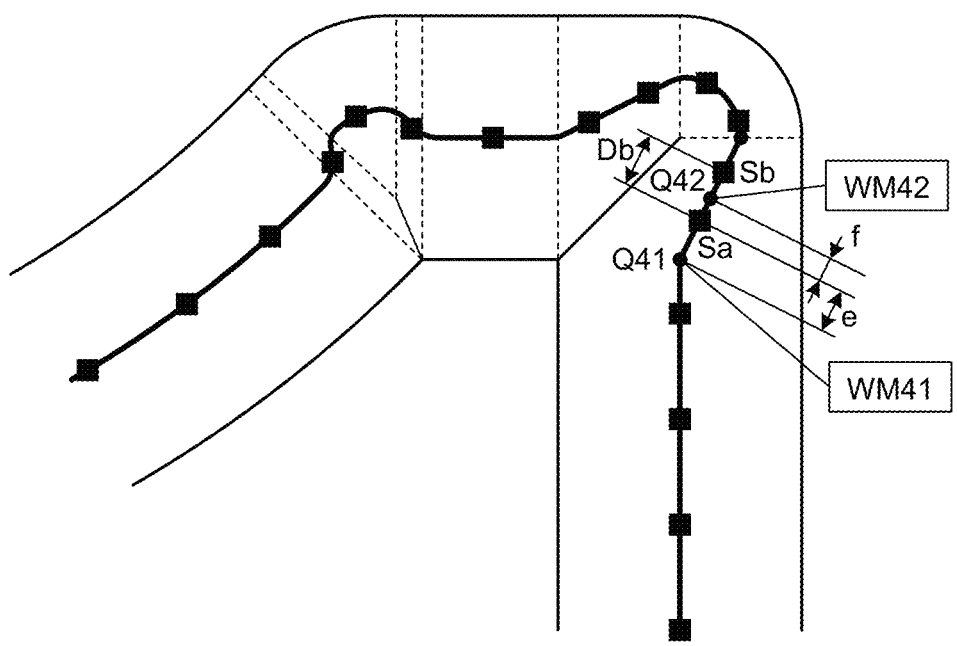
FIG. 26 is a diagram for explaining generation of a point manufacturing path in a point manufacturing path conversion unit illustrated in FIG. 1.

FIG. 26 is a diagram for explaining generation of a point manufacturing path in the point manufacturing path conversion unit 14 illustrated in FIG. 1. When the point manufacturing path conversion instruction data instructs to generate a path for point manufacturing, the point manufacturing path conversion unit 14 generates points for performing point manufacturing on the corrected path. The point manufacturing path conversion unit 14 generates the point manufacturing path using the corrected path data and the point manufacturing path definition data. As the point manufacturing path definition data, a ratio O of an interval between the points with respect to the width of the bead cross section after correction is given. The points for point manufacturing are sequentially generated in a forward direction of the corrected path. At this time, the interval between a certain point already generated and a point to be generated next is determined on the basis of the corrected width for the point and the ratio O of the interval between the points. In FIG. 26, a point Sa is a point for point manufacturing and is on the corrected path between the point Q41 and the point Q42. A width WMa of the bead cross section with respect to the point Sa is calculated using the following expression (4).

$$WMa=(f \times WM41+e \times WM42)/(e+f) \qquad (4)$$

Here, "WM41" is the corrected width for the point Q41, and "WM42" is the corrected width for the point Q42. The widths WM41 and the WM42 are added to the data output by the bead height calculation unit 13. Moreover, "e" is a distance between the point Q41 and the point Sa, and "f" is a distance between the point Sa and the point Q42. As the values of "e" and "f", the length of the manufacturing path between the point Q41 and the point Sa and the length of the manufacturing path between the point Sa and the point Q42 may be used, respectively.

A point Sb for point manufacturing to be generated after the point Sa is a point separated from the point Sa by a distance Db. Here, the distance Db is calculated using the following expression (5).

$$Db=O \times (WMa+WMb)/2 \qquad (5)$$

Here, "WMb" is a width of the bead cross section with respect to the point Sb obtained by a calculation method similar to that for "WMa".

The point manufacturing path conversion unit 14 generates corrected path data converted into the point manufacturing path by adding the width data and the height data of the bead cross section to the data of the points for point manufacturing calculated using the method described above, and outputs the generated corrected path data to the control information output unit 15. Here, the height data of the bead cross section can be calculated similarly to the width data. For example, a height HGb for the point Sa can be calculated using the following expression (6).

$$HGb=(f \times HG41+e \times HG42)/(e+f) \qquad (6)$$

Here, "HG41" is a height of the bead cross section with respect to the point Q41, and "HG42" is a height of the bead cross section with respect to the point Q42. The point data for point manufacturing generated using the method described above is generated at appropriate intervals in accordance with the corrected width of the bead cross section. As a result, the accuracy of manufacturing in point manufacturing can be improved.

The description refers back to FIG. 12. The control information output unit 15 generates control information indicating the corrected path as well as the corrected width and the bead height, which are the bead width and height of a manufacturing target, on the basis of the corrected path data output from the point manufacturing path conversion unit 14 (step S304). The control information output unit 15 outputs the generated control information to the outside of the CAM device 1. The control information includes, for example, the manufacturing path, the corrected width, and the height data, and is a control program for controlling the additive manufacturing apparatus 21.

Next, a hardware configuration of the CAM device 1 according to the first embodiment of the present invention will be described. Each unit of the CAM device 1 is implemented by processing circuitry. The processing circuitry may be implemented by dedicated hardware, or may be a control circuit using a central processing unit (CPU).

Figure 27:
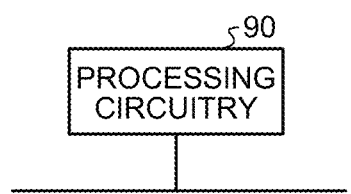
FIG. 27 is a diagram illustrating dedicated hardware for implementing the functions of the CAM device illustrated in FIG. 1.

When implemented by dedicated hardware, the above processing circuitry is implemented by processing circuitry 90 illustrated in FIG. 27. FIG. 27 is a diagram illustrating dedicated hardware for implementing the functions of the CAM device 1 illustrated in FIG. 1. The processing circuitry 90 is a single circuit, a complex circuit, a programmed processor, a parallel-programmed processor, an application specific integrated circuit (ASIC), a field programmable gate array (FPGA), or a combination of those.

Figure 28:
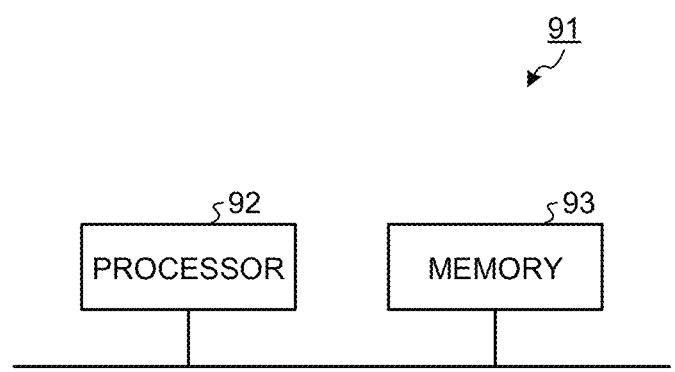
FIG. 28 is a diagram illustrating a configuration of a control circuit for implementing the functions of the CAM device illustrated in FIG. 1.

When the above processing circuitry is implemented by a control circuit using a CPU, the control circuit is, for example, a control circuit 91 having a configuration illustrated in FIG. 28. FIG. 28 is a diagram illustrating a configuration of the control circuit 91 for implementing the functions of the CAM device 1 illustrated in FIG. 1. As illustrated in FIG. 28, the control circuit 91 includes a processor 92 and a memory 93. The processor 92 is the CPU and is also referred to as a central processor, a processing unit, an arithmetic unit, a microprocessor, a microcomputer, a digital signal processor (DSP), or the like. The memory 93 is, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, a digital versatile disc (DVD), or the like.

When implemented by the control circuit 91, the above processing circuitry is implemented by the processor 92 reading and executing a program stored in the memory 93, the program corresponding to the processing of each component. The memory 93 is also used as a temporary memory for each processing executed by the processor 92.

As described above, according to the control information generation device 10 of the first embodiment of the present invention, the manufacturing path can be corrected such that the beads are adjacent to each other without overlapping, whereby the overlapping of the beads can be avoided, and the unevenness of the processing material can be reduced to improve the manufacturing quality. In particular, in the portion where the manufacturing path changes in direction, the manufactured shape is likely to be deformed when the beads overlap, whereas in the present embodiment, the beads are adjacent to each other without overlapping so that the manufacturing quality can be improved.

Moreover, the path correction unit 12 obtains the corrected position on the basis of allowing the target path, which is included in the manufacturing path, and the adjacent path, which is adjacent to the target path, to share the manufacturing. Therefore, even when the interval between the target path and the adjacent path is not constant, the overlapping of the beads and the unevenness of the processing material can be reduced, and the manufacturing quality can be improved. The path correction unit 12 further adjusts the corrected position on the basis of the manufacturing order of the target path and the adjacent path. The manufacturing shape of the bead differs due to the influence of surface tension between a case where the adjacent path is already present and a case where the adjacent path is not present. Therefore, the corrected position can be adjusted in consideration of the shape of each bead, and the manufacturing quality can be improved.

The bead width correction unit 11 sets the corrected width of the corner portion of the manufacturing path to be smaller than the reference width WB such as half thereof, and the path correction unit 12 obtains the corrected path that goes around the outside of the corner portion. When a bead having a uniform width is used at the corner portion of the manufacturing path, the amount of the processing material increases on the inner side of the corner portion as compared to the outer side of the corner portion and the linear portion, which causes the amount of processing material to be uneven and the manufacturing quality to be reduced. On the other hand, the present embodiment can reduce the overlapping of the beads and the unevenness of the processing material even at the corner portion of the manufacturing path, and thus the manufacturing quality can be improved regardless of the bent angle.

The bead width correction unit 11 can obtain the corrected width on the basis of the curvature of the manufacturing path. Specifically, the bead width correction unit 11 decreases the corrected width as the curvature of the manufacturing path is larger. When the radius of curvature of the manufacturing path is smaller than half the reference width WB of the bead, the beads may overlap on a side of the center of the curvature, which may result in the unevenness of the processing material. On the other hand, the present embodiment corrects the width of the bead in consideration of the curvature, and thus can improve the manufacturing quality.

Moreover, the bead height calculation unit 13 obtains the average height of the bead cross section, and the control information output unit 15 outputs the control information indicating the average height in addition to the corrected path and the corrected width. As a result, the control device 22 included in the additive manufacturing apparatus 21 can adjust the height of the bead by adjusting the amount of the processing material using the control information, so that the unevenness of the processing material can be reduced and that the manufacturing quality can be improved.

The point manufacturing path conversion unit 14 converts the corrected path into the point manufacturing path represented by discrete points on the corrected path. The point manufacturing path conversion unit 14 determines the interval of the discrete points on the basis of at least one of the corrected width and the average height. Such a configuration can improve the manufacturing quality by the discrete points.

The configuration illustrated in the above embodiment merely illustrates an example of the content of the present invention, and can thus be combined with another known technique or partially omitted and/or modified without departing from the scope of the present invention.

For example, in the above embodiment, the control information generation device 10 is built in the CAM device 1, but the control information generation device 10 may be a device separate from the CAM device 1.

Furthermore, the technique described in the above embodiment can be implemented not only as the control information generation device 10 or the additive manufacturing system 100 including the control information generation device 10, but also as a control information generation method including the operation of each function of the control information generation device 10, and as a computer program describing each operation of the control information generation method. This computer program can be provided via a communication path or can be provided by being stored in a recording medium.

REFERENCE SIGNS LIST

1 CAM device; 2 manufacturing shape data acquisition unit; 3 path definition data acquisition unit; layer shape generation unit; 5 manufacturing path generation unit; 6 manufacturing shape data storage unit; 7 path definition data storage unit; 8 layer shape data storage unit; 9 manufacturing path data storage unit; 10 control information generation device; 11 bead width correction unit; 12 path correction unit; 13 bead height calculation unit; 14 point manufacturing path conversion unit; 15 control information output unit; 20 control information storage unit; 21 additive manufacturing apparatus; 22 control device; 90 processing circuitry; 91 control circuit; 92 processor; 93 memory; 100 additive manufacturing system; 400 shape; 401 base shape; 402 surface; 410, 411 layer shape; HB height; WB reference width.

The invention claimed is:

1. A control information generation device that generates control information for controlling an additive manufacturing apparatus that manufactures a layer shape using a bead that is a manufactured object formed by adding a molten processing material to a target surface while moving a processing position along a manufacturing path, and manufactures a three-dimensional shape in which the layer shapes are stacked, the control information generation device comprising:

bead width correction circuitry to obtain a corrected width on the basis of the manufacturing path and a reference width of a cross section of the bead, the corrected width being a width of the cross section for allowing the beads to be adjacent to each other without overlapping, and the bead width correction circuitry sets the corrected width of a corner portion of the manufacturing path at an exterior corner of the layer shape to be smaller than the reference width;

path correction circuitry to obtain a corrected path on the basis of the manufacturing path and the corrected width; and control information output circuitry configured to output control information indicating the corrected path and the corrected width to control the additive manufacturing apparatus that manufactures the layer shape to manufacture the three-dimensional shape in which the layer shapes are stacked.

2. The control information generation device according to claim 1, wherein the path correction circuitry obtains the corrected path on the basis of allowing a target path included in the manufacturing path and an adjacent path adjacent to the target path to share manufacturing.

3. The control information generation device according to claim 1, wherein
the path correction circuitry obtains the corrected path that goes around the outside of the corner portion.

4. The control information generation device according to claim 1, wherein the bead width correction circuitry obtains the corrected width on the basis of a curvature of the manufacturing path.

5. The control information generation device according to claim 4, wherein the bead width correction circuitry sets the corrected width to be smaller as the curvature is larger.

6. The control information generation device according to claim 2, wherein the path correction circuitry adjusts the corrected path on the basis of a manufacturing order of the target path and the adjacent path.

7. The control information generation device according to claim 1, further comprising bead height calculation circuitry to obtain an average height of the cross section of the bead on the basis of the corrected path, the corrected width, and the layer shape, wherein the control information output circuitry outputs the control information further indicating the average height.

8. The control information generation device according to claim 7, further comprising point manufacturing path conversion circuitry to convert the corrected path into a point manufacturing path represented by discrete points on the corrected path, wherein the point manufacturing path conversion circuitry determines an interval of the discrete points on the basis of the corrected width.

9. A control information generation method that generates control information for controlling an additive manufacturing apparatus that manufactures a layer shape using a bead that is a manufactured object formed by adding a molten processing material to a target surface while moving a processing position along a manufacturing path, and manufactures a three-dimensional shape in which the layer shapes are stacked, the control information generation method comprising:

obtaining by, a control information generation device that generates the control information, a corrected width on the basis of the manufacturing path and a reference width of a cross section of the bead, the corrected width being a width of the cross section for allowing the beads to be adjacent to each other without overlapping;

setting the corrected width of a corner portion of the manufacturing path at an exterior corner of the layer shape to be smaller than the reference width;

obtaining by, the control information generation device, a corrected path on the basis of the manufacturing path and the corrected width; and outputting by, the control information generation device, control information indicating the corrected path and the corrected width to control the additive manufacturing apparatus that manufactures the layer shape to manufacture the three-dimensional shape in which the layer shapes are stacked.

* * * * *